(12) United States Patent
Nishiyama (10) Patent No.: US 11,461,957 B2
(45) Date of Patent: Oct. 4, 2022

(54) INFORMATION PROCESSING DEVICE, INFORMATION PROCESSING METHOD, AND PROGRAM

(71) Applicant: SONY INTERACTIVE ENTERTAINMENT INC., Tokyo (JP)

(72) Inventor: Akira Nishiyama, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/269,346

(22) PCT Filed: Sep. 3, 2018

(86) PCT No.: PCT/JP2018/032653
§ 371 (c)(1),
(2) Date: Feb. 18, 2021

(87) PCT Pub. No.: WO2020/049619
PCT Pub. Date: Mar. 12, 2020

(65) Prior Publication Data
US 2021/0312699 A1    Oct. 7, 2021

(51) Int. Cl.
| | |
|---|---|
| *G06T 15/08* | (2011.01) |
| *G06T 7/90* | (2017.01) |
| *G06T 3/40* | (2006.01) |
| *G06T 15/20* | (2011.01) |

(52) U.S. Cl.
CPC ............ *G06T 15/08* (2013.01); *G06T 3/40* (2013.01); *G06T 7/90* (2017.01); *G06T 15/20* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2009/0175543 A1* | 7/2009 | Nielsen | G06T 17/20 702/179 |
| 2011/0080336 A1* | 4/2011 | Leyvand | G06V 40/10 382/103 |
| 2016/0012646 A1* | 1/2016 | Huang | G06T 7/30 345/419 |

FOREIGN PATENT DOCUMENTS

| | | |
|---|---|---|
| JP | 2006-133940 A | 5/2006 |
| JP | 2011-70387 A | 4/2011 |
| JP | 2017-019351 A | 1/2017 |
| JP | 2017-191351 A | 10/2017 |

(Continued)

OTHER PUBLICATIONS

Machine translation of JP2011-070387 (Year: 2011).*

(Continued)

*Primary Examiner* — Peter Hoang
(74) *Attorney, Agent, or Firm* — Katten Muchin Rosenman LLP (57) ABSTRACT

Provided is an information processing device that acquires appearance information associated with an appearance of a target object to be a target of drawing, and determines a parameter associated with a resolution of the target object and used in the drawing of a condition of the target object as viewed from a given viewpoint, on the basis of a color distribution on the surface of the target object and information associated with a distance from the viewpoint to the target object, the color distribution being specified from the acquired appearance information.

5 Claims, 6 Drawing Sheets

(56) References Cited

FOREIGN PATENT DOCUMENTS

| WO | 2006/132194 A1 | 12/2006 |
|---|---|---|
| WO | 2018062251 A1 | 4/2018 |
| WO | 2018074419 A1 | 4/2018 |

OTHER PUBLICATIONS

Decision to Grant a Patent dated Nov. 30, 2021, from Japanese Patent Application No. 2020-540886, 2 sheets.
Nakamura, Hiroshi et al.—detailed degree control of the section type volume in consideration of a classification-by-color cloth—[Visual ]Computing graphics and CAD Joint symposium 2000 Proceedings, Jan. 15, 2001,p. 27-32, 8 sheets.
Matsumoto * et al.—[ vision characteristics ] a high-speed display with the sinking type system by the used detailed degree control, and the 25th Japan Society for Simulation Technology conventions Announcement collected papers, Aug. 14, 2007,and p. 65-68, 6 sheets.
International Search Report and Written Opinion dated Oct. 23, 2018, from PCT/JP2018/032653, 10 sheets.
Matsumoto, Shigeru et al., A LOD Control of Polygons for Immersive Display based on Human Vision, Proceedings of the 25th Japan Simulation Conference, Aug. 14, 2007 (received date), pp. 65-68, 6 sheets.
Nakamura, Hiroko et al., non-official translation (A LOD control of interval volumes taking into account color distribution, Proceedings of Visual Computing Graphics and CAD Symposium 2000), Visual Computing CAD 2000, Jan. 15, 2001 (received date), pp. 27-32, 8 sheets.
International Preliminary Report on Patentability dated Mar. 18, 2021, PCT/JP2018/032653, 15 sheets.
Fenglin Tian et al: "Adaptive voxels: interactive rendering of massive 3D models", The Visual Computer; International Journal of Computer Graphics, Springer, Berlin, DE, vol. 26, No. 6-8, Apr. 21, 2010 (Apr. 21, 2010), pp. 409-419, XP019845837, ISSN: 1432-2315.
Taosong He et al: "Voxel based object simplification", Visualization, 1995. Visualization '95. Proceedings., IEEE Conference on Atlanta, GA, USA OCT. 29-Nov. 3, 1995, Los Alamitos, CA, USA, IEEE Comput. Soc, US, Oct. 29, 1995 (Oct. 29, 1995), p. 296, XP058366609, DOI: 10.1109/VISUAL.1995.485142 ISBN: 978-0-8186-7187-6.
Tazir Mohamed Lamine et al: "Color-based 3D point cloud reduction", 2016 14th International Conference on Control, Automation, Robotics and Vision (ICARCV), IEEE, Nov. 13, 2016 (Nov. 13, 2016), pp. 1-7, XP033054385, DOI: 10.1109/ICARCV.2016.7838685 [retrieved on Jan. 31, 2017].
The extended European search report dated Apr. 11, 2022, from European Patent Application No. 18932436.1, 5 sheets.

* cited by examiner

INFORMATION PROCESSING DEVICE, INFORMATION PROCESSING METHOD, AND PROGRAM

TECHNICAL FIELD

The present invention relates to an information processing device, an information processing method, and a program that determine parameters to be used in drawing an image representing a condition of a virtual space in which a target object to be a target of draining is arranged.

BACKGROUND ART

An image which represents a condition of a virtual space in which a target object such as a real person is arranged is sometimes drawn, on the basis of information representing an appearance of the target object. As a specific example, there is known a technique that generates a virtual object reproducing an appearance of a capture target by capturing a distance image with use of a distance image sensor capable of specifying a distance to the capture target, and arranging, in a virtual space, unit volume elements (voxels or the like) having predetermined shapes and sizes and corresponding to unit portions included in the distance image. Such a technique makes it possible to draw a space image representing a condition of the virtual space including the target object and to present the space image to a viewer.

SUMMARY

Technical Problems

In order to express the appearance of the target object in detail, there is a need for increasing the resolution of the target object to be drawn, by means of, for example, the reduction of the sizes of the unit volume elements, or any other similar method. Increasing the resolution, however, causes increased drawing load and increased communication amount at the time of transmitting data.

The present invention has been made in view of the above actual situation, and one of objects of the present invention is to provide an information processing device, an information processing method, and a program that are capable of drawing an image including a target object, according to the characteristics of an appearance of the target object, with a resolution suitable for the appearance.

Solution to Problems

An information processing device according to the present invention includes an appearance information acquisition section that acquires appearance information associated with an appearance of a target object to be a target of drawing and a parameter determination section that determines a parameter associated with a resolution of the target, object and used in the drawing of a condition of the target object as viewed from a given viewpoint, on the basis of a color distribution on a surface of the target object and information associated with a distance from the viewpoint to the target object, the color distribution being specified by the acquired appearance information.

An information processing method according to the present invention includes the steps of acquiring appearance information associated with an appearance of a target object to be a target of drawing, and determining a parameter associated with a resolution of the target object and used in the drawing of a condition of the target object as viewed from a given viewpoint, on the basis of a color distribution on a surface of the target object and information associated with a distance from the viewpoint to the target object, the color distribution being specified by the acquired appearance information.

A program according to the present invention is a program that causes a computer to execute the steps of acquiring appearance information associated with an appearance of a target object to be a target of drawing, and determining a parameter associated with a resolution of the target object and used in the drawing of a condition of the target object as viewed from a given viewpoint, on the basis of a color distribution on a surface of the target object and information associated with a distance from the viewpoint to the target object, the color distribution being specified by the acquired appearance information. This program may be provided in such a way as to be stored in a non-transitory computer-readable information storage medium.

DESCRIPTION OF EMBODIMENT

Hereinafter, an embodiment of the present invention will be described in detail on the basis of the drawings.

Figure 1:
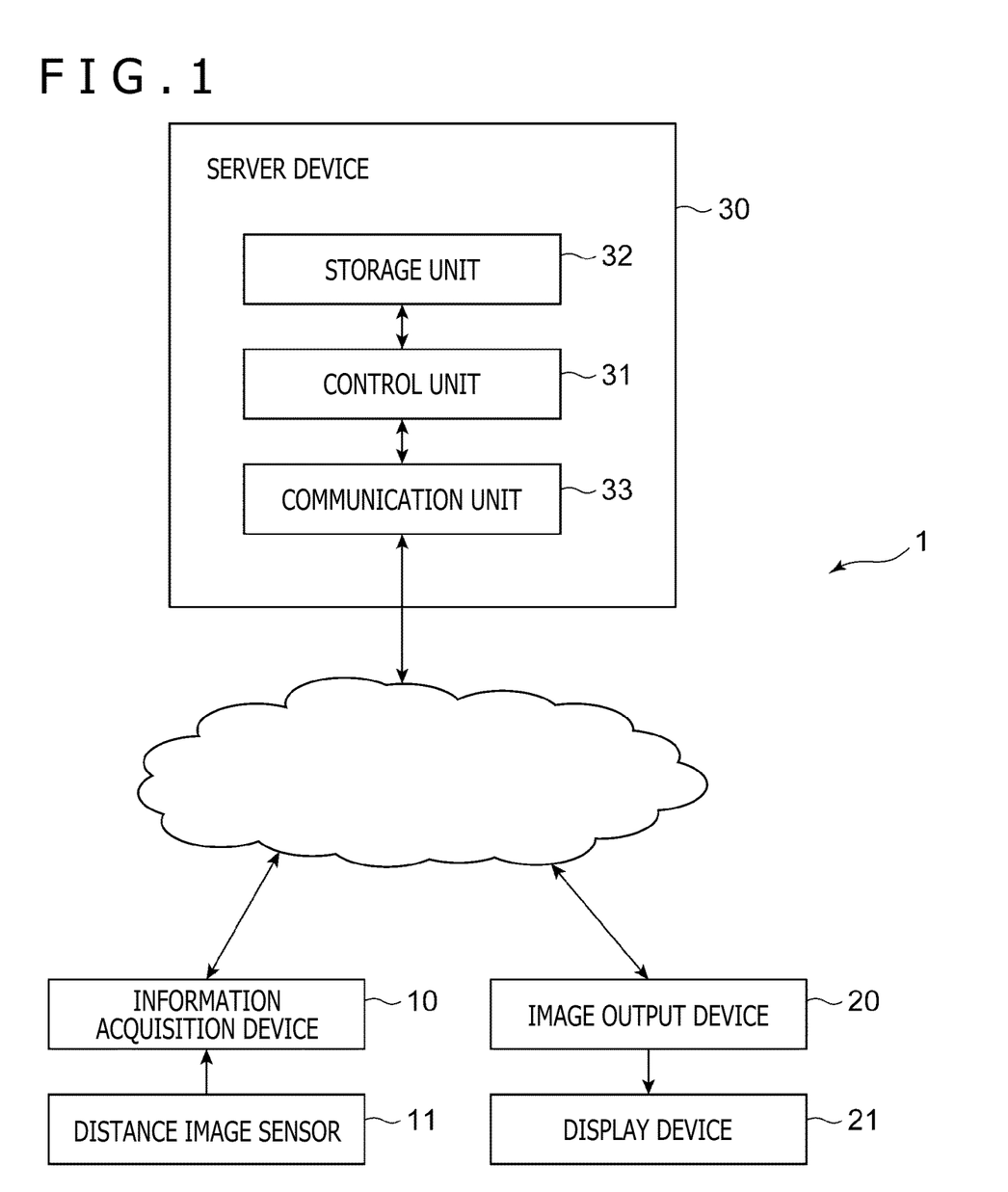
FIG. 1 is an entire overview of an information processing system including an information processing device according to an embodiment of the present invention.
Figure 3:
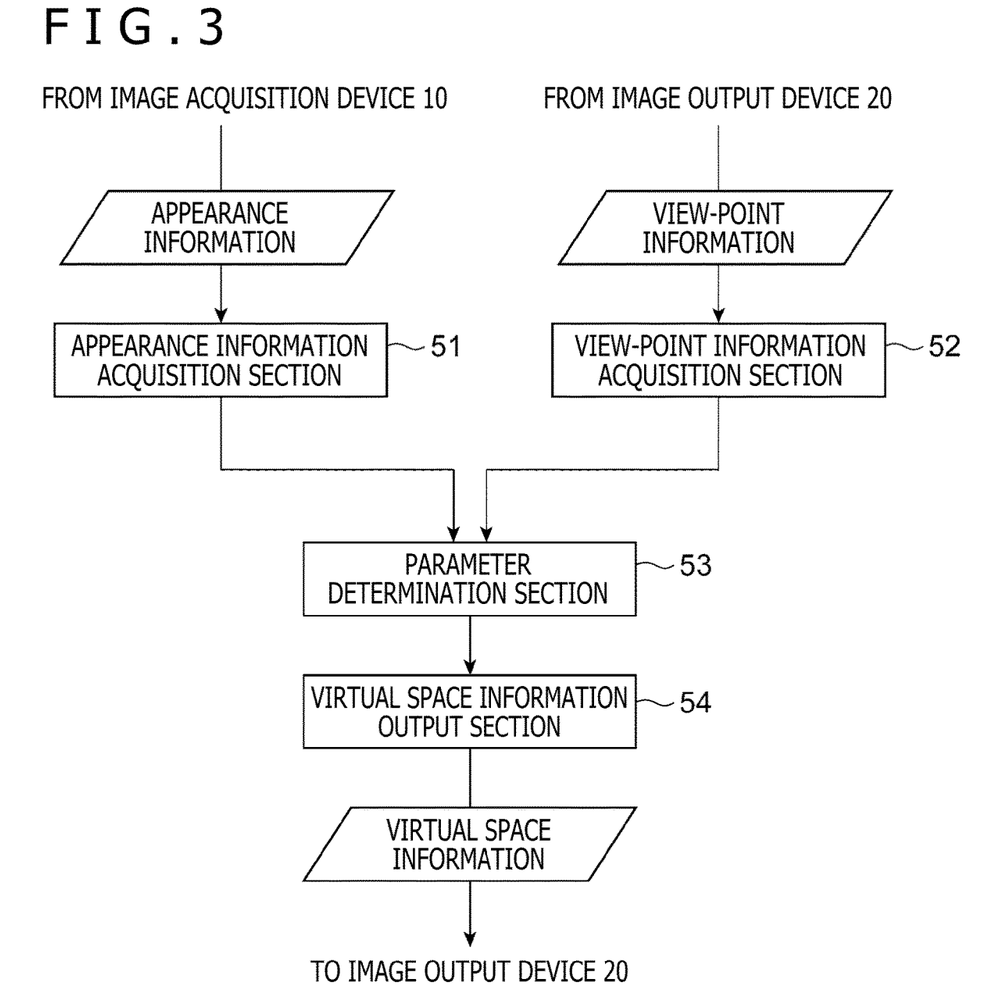
FIG. 3 is a function block diagram illustrating the functions of an information processing device according to an embodiment of the present invention.

FIG. 1 is an entire overview of an information processing system 1 including an information processing device according to an embodiment of the present invention. As illustrated in FIG. 3, the information processing system 1 includes an information acquisition device 10, an image output, device 20, and a server device 30, and the individual devices are mutually coupled so as to be capable of transmitting/receiving data to/from one another via a communication network such as the Internet. In a specific example described below, the server device 30 functions as the information processing device according to an embodiment of the present invention. Note that, although, in FIG. 1, the information processing system 1 includes, for each of the information acquisition device 10, the image output device 20, and the server device 30, one corresponding device, the information processing system 1 may include, for each of the above kinds of devices, a plurality of corresponding devices.

According to the information processing system 1, an image which represents a condition of a virtual space in which an object reflecting an appearance of a target object T to be a target of drawing is arranged is drawn and presented to a viewer (a user of the image output device 20). In the following, the target object T is assumed to be a person using the information acquisition device 10.

The information acquisition device 10 is an information processing device, such as a personal computer or a home game machine, and is coupled to a distance image sensor 11. The distance image sensor 11 observes a condition of a real space including the target object T, and acquires information needed to generate a distance image (depth map). The distance image sensor 11 may be, for example, a stereo camera constituted by a plurality of cameras arranged on left and right sides. The information acquisition device 10 acquires images captured by the plurality of cameras and generates the distance image on the basis of the captured images. Specifically, the information acquisition device 10 is capable of calculating a distance from a capturing position (observation point) of the distance image sensor 11 to a capture target being captured in the captured images, by using differences in parallax for the plurality of cameras. Note that the distance image sensor 11 is not limited to the stereo camera, and may be any sensor capable of measuring the distance to the capture target by means of a different method, such as a TOF method.

The distance image is an image that, for each of the unit regions included within the range of a view field, includes information indicating a distance to a capture target being captured in the unit region. In the present embodiment, the distance image sensor 11 is placed so as to face the target object T (a person). Thus, the information acquisition device 10 is capable of calculating, for each of a plurality of unit portions being captured in the distance image and included in the surface of the target object T, position coordinates of the unit portion in a real space, by using a result of the detection by the distance image sensor 11. Here, the unit portion is a partial portion constituting the surface of the target object T and corresponding to one of the unit regions in the distance image.

The information acquisition device 10 specifies a real, space position of each of the unit portions constituting the target, object T, on the basis of the information indicating a distance to the capture target and included in the distance image. Further, the information acquisition device 10 specifies a color component value of each of the unit portions from pixel values of a capture image corresponding to the distance image. In this way, the information acquisition device 10 is capable of acquiring data indicating the position and color of each of the unit portions constituting the surface of the target object T. Hereinafter, the data specifying the position and color of each of the unit portions constituting the target object T will be referred to as appearance information. At each of predetermined time intervals, the information acquisition device 10 generates appearance information representing an appearance of the target object T, on the basis of a result of the detection by the distance image sensor 11, and transmits the generated appearance information to the server device 30. As described later, arranging unit volume elements, which are each associated with a corresponding one of the plurality of unit portions, with use of the appearance information makes it possible to reproduce the appearance of the target object T in the virtual space. Each of the unit volume elements in this case is a relatively small object having a predetermined size and a predetermined shape (for example, a cube, a sphere, or the like). Here, the smaller the size of each of the unit volume elements is made, the further a resolution at the time of reproducing the target object T in the virtual space is increased, and thus, the further the reproduction can be made similar to the real target object T.

Figure 2:
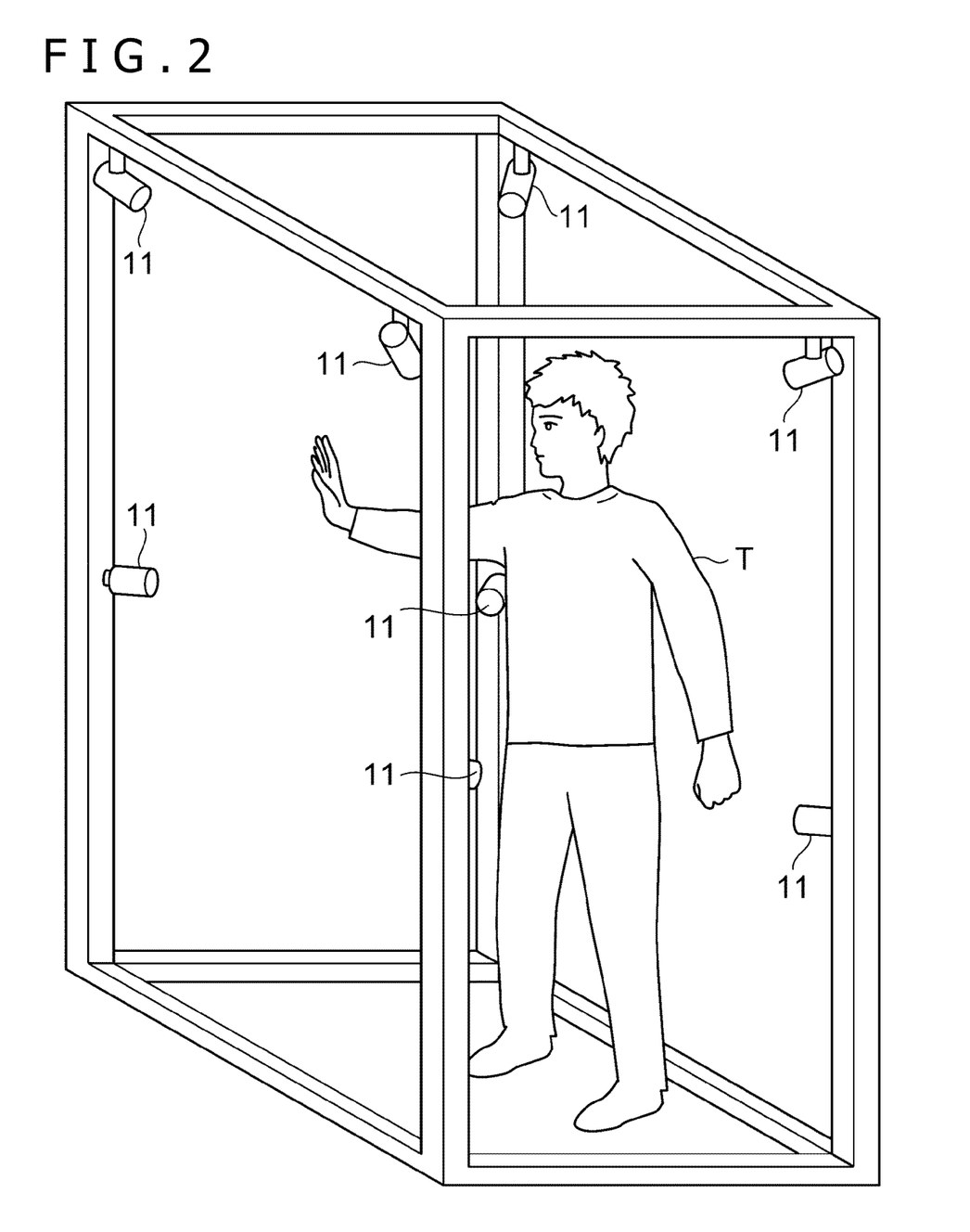
FIG. 2 is a diagram illustrating an example of a condition in which distance image sensors acquire appearance information associated with a target object T.

Note that, in the above description, a configuration in which one distance image sensor 11 is coupled to the information acquisition device 10 is employed, but without being limited to this configuration, a configuration in which a plurality of distance image sensors 11 are coupled to the information acquisition device 10 may be employed. For example, employing a configuration in which two or more distance image sensors 11 located at mutually different positions and directed in mutually different directions are arranged so as to surround the target object T enables the information acquisition device 10 to acquire appearance information associated with wider range of the surface of the target object T by integrating sets of information acquired from the individual distance image sensors 11. FIG. 2 illustrates an example of a case in which a plurality of the distance image sensors 11 acquire appearance information associated with the entire target object T in such a way as described above.

The image output device 20 is an information processing device, such as a personal computer, a home game machine, a portable game machine, a smartphone, or a tablet, and is coupled to the display device 21.

The display device 21 displays a video based on a video signal supplied from the image output device 20. The display device 21 may be a stationary type device such as a liquid crystal display, or may be a head-mounted type display device used by a user in such a way as to be worn on his or her head. Further, the display device 21 may be a set of various kinds of display panels arranged inside the housing of the image output device 20.

The server device 30 arranges, in the virtual space, unit volume elements representing the target object T, other objects, and the like, on the basis of the appearance information received from the information acquisition device 10. Further, the server device 30 calculates behaviors of the objects arranged in the virtual space, by performing arithmetic processing such as physical arithmetic processing. Further, the server device 30 transmits, to the image output device 20, information associated with the positions, shapes, and the like for the objects arranged in the virtual space. Here, the positions, shapes, and the like for the objects are obtained as a result of the calculation.

Particularly, in the present embodiment, the server device 30 determines a parameter associated the resolution of the target object T included in a space image to be drawn by the image output device 20. Specifically, the server device 30 is configured in such a way as to change, from a predetermined reference value, the sizes of the unit volume elements representing the target object T according to such control as described later. The sizes of the unit volume elements define the resolution of the target object T included in the space image, and thus, changing the sizes of the unit volume elements to sizes larger than the reference value results in a thinner resolution of the space image.

As illustrated in FIG. 1, the server device 30 includes a control unit 31, a storage unit 32, and a communication unit 33. The control unit 31 includes at least one processor and performs various information processes by executing a program stored in the storage unit 32. A specific example of the processes performed by the control unit 31 in the present embodiment will be described later. The storage unit 32 includes at least one memory device, such as a RAM (Random Access Memory), and stores the program executed by the control unit 31 and data processed by the program. The communication unit 33 is a communication interface, such as a LAN (Local Area Network) card, and performs transmission/reception of data to/from the information acquisition device 10 and the image output device 20 via a communication network.

Hereinafter, functions implemented by the server device 30 in the present embodiment will be described on the basis of FIG. 3. As illustrated in FIG. 3, the server device 30 functionally includes an appearance information acquisition section 51, a viewpoint information acquisition section 52, a parameter determination section 53, and a virtual space information output section 54. These functions are implemented by allowing the control unit 31 to execute the program scored in the storage unit 32. This program may be provided to the image output device 20 via a communication network such as the Internet, or may be provided in such a way as to be stored in a computer readable information storage medium such as an optical disk.

The appearance information acquisition section 51 acquires the appearance information associated with the target object T and transmitted from the information acquisition device 10. As described above, the appearance information in the present embodiment is data representing the positions and color component values of the unit volume elements constituting the surface of the target object T.

The viewpoint information acquisition section 52 acquires viewpoint information representing position coordinates of a viewpoint position VP and a line of sight in the virtual space. Here, the position coordinates and the line of sight are used in drawing the space image including the target object T. In the present embodiment, the viewpoint information acquisition section 52 is configured in such a way as to acquire the viewpoint information from the image output device 20. A viewer (a user of the image output device 20), for example, inputs an instruction for changing the viewpoint position VP and/or the line of sight by performing an operation of an operation device or any other similar operation. The image output device 20 periodically transmits, to the server device 30, the viewpoint information determined according to the instruction received from the viewer.

The parameter determination section 53 determines a parameter associated with the resolution of the target object T and used in drawing of the space image including the target object T. Specifically, the parameter determination section 53 is configured in such a way as to determine the size of each of the unit volume elements arranged in the virtual space, as the parameter associated with the resolution. As a result, the individual unit volume elements constituting the target object T may have mutually different sizes.

Figure 4:
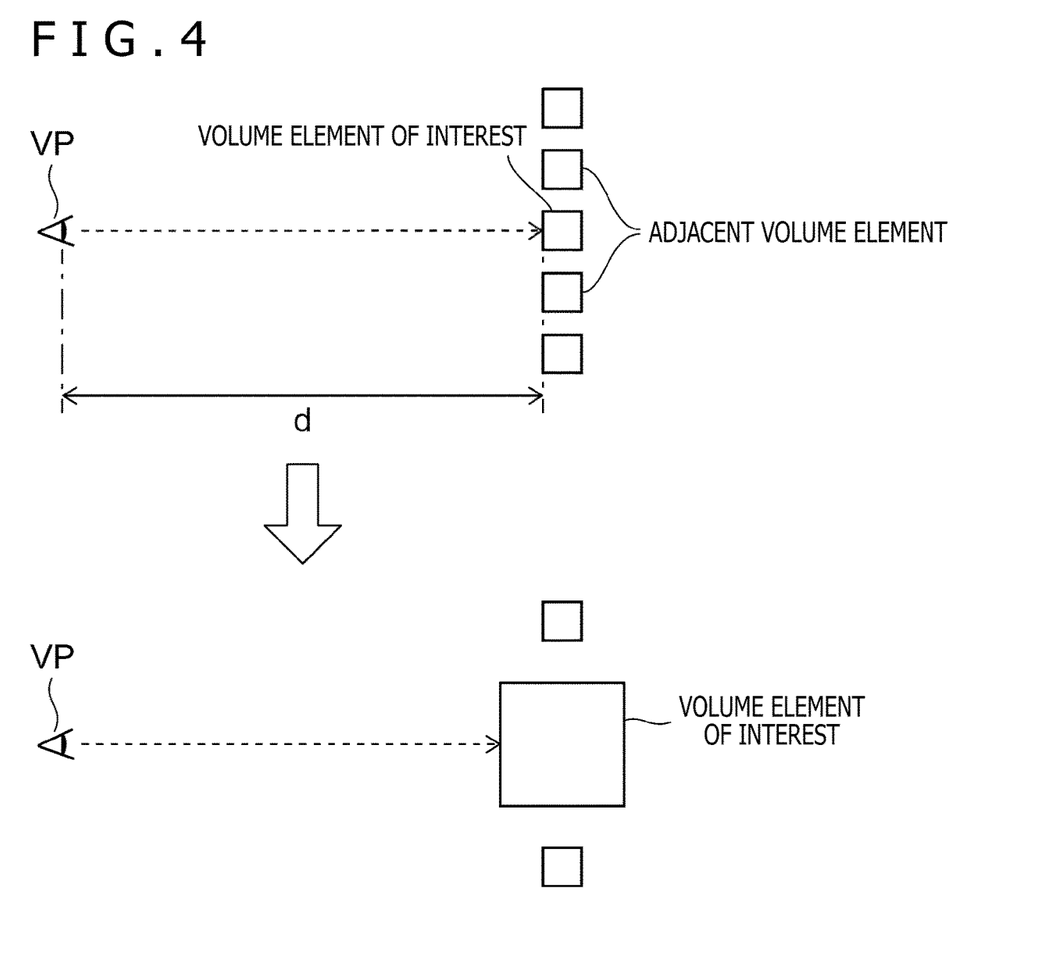
FIG. 4 is a diagram that describes control for changing the size of a volume element of interest.

Particularly, in the present embodiment, the parameter determination section 53 is configured in such a way as to determine the size of each of the unit volume elements on the basis of a color distribution on the surface of the target object T and information associated with a distance from the viewpoint position VP to the target object T in the virtual space. Here, the color distribution is specified by the appearance information acquired by the appearance information acquisition section 51. For example, the parameter determination section 53 is configured in such a way as to, for a certain unit volume element of interest, in the case where the color of the unit volume element of interest is almost the same as the color of each of surrounding unit volume elements adjacent to the unit volume element of interest, enlarge the size of the unit volume element of interest and delete the surrounding unit volume elements instead. More specifically, in the case where differences among color component values of interest (which are here assumed to be luminance values) of unit volume elements adjacent to one another are smaller than or equal to a given threshold value, it is supposed to be difficult for a viewer to distinguish color differences for the unit volume elements. For this reason, even if the resolution of the target object T is lowered by enlarging the size of the volume element of interest, the viewer is unlikely to notice the lowered resolution. Thus, the parameter determination section 53 is, as described above, configured in such a way as to enlarge the size of a volume element of interest having a color component value close to color component values of adjacent volume elements and delete the adjacent volume elements. This configuration lowers the resolution of the target object T in the vicinity of the volume element of interest, but makes it possible to reduce the number of the unit volume elements. Further, even though the resolution of the target object T is lowered by such control, a viewer viewing the space image is unlikely to feel a sense of strangeness provided that the color distribution of a target region of the surface of the target object T is relatively unchanged. FIG. 4 illustrates an example of a condition in which the size cf a volume element of interest is changed by such control as described above, and further illustrates a condition of partial unit volume elements arranged in a virtual space as viewed from the lateral side.

Further, in the present embodiment, the parameter determination section 53 is configured in such a way as to change, according to a distance d from the viewpoint position VP to the volume element of interest, a threshold value for determining that the change of a color distribution in the vicinity of the volume element of interest is small (that is, differences between a color component value of the volume element of interest and color component values of adjacent unit volume elements are small). For example, the parameter determination section 53 increases the threshold value, which is used for determining that each of adjacent unit volume elements has the same color component value as that of the volume element of interest, in the case where the distance d is large, and decreases the threshold value in the case where the distance d is small. This configuration makes it possible to cause the lowering of the resolution to be difficult when the target object T is located relatively close to the viewpoint position VP, and to be easy when the target object T is located relatively far from the viewpoint position VP.

Furthermore, the change of the threshold value in this case is preferably made not in proportion to the distance d or its square, but in a non-linear manner in view of a human visual characteristic. Specifically, as this human visual characteristic, there is known a characteristic that is called CSS* (Contrast sensitivity function). In general, this characteristic is defined by the following characteristic function representing the relation between contrast sensitivity A and a space frequency f (cycle/degree).

$$A(f)=2.6(0.0192+0.114f) \cdot e^{-(0.114f)^{1.1}}$$ [Math. 1]

The space frequency f represents the number of contrast change cycles per one degree as viewed from the viewpoint position VP. Since the distance between adjacent unit volume elements is determined in advance, the space frequency f is associated with the distance d. Thus, the parameter determination section 53 calculates a distance d on the basis of position information associated with the viewpoint position VP and acquired by the viewpoint information acquisition section 52, and determines the value of a space frequency f corresponding to the calculated distance d. Substituting the determined value of f into the above-described characteristic function can yield an acceptable value associated with contrast for adjacent unit volume elements (i.e., a lower limit value for luminance differences supposed to be identifiable by human beings). In the case where differences between a luminance value of the volume element of interest and luminance values of volume elements adjacent thereto are smaller than the acceptable value, it is supposed to be difficult for persons to perceive differences in color therebetween, and thus, the parameter determination section 53 enlarges the size of the volume element of interest. In addition, in conjunction with the enlargement, the parameter determination section 53 deletes the adjacent volume elements that are now to be included in an enlarged range of the volume element of interest. This configuration makes it possible to reduce the number of the unit volume elements. In contrast, in the case where the differences for the luminance value are equal to or larger than the acceptable value, the size of the volume element of interest is not changed and is kept to its initial value.

Figure 5:
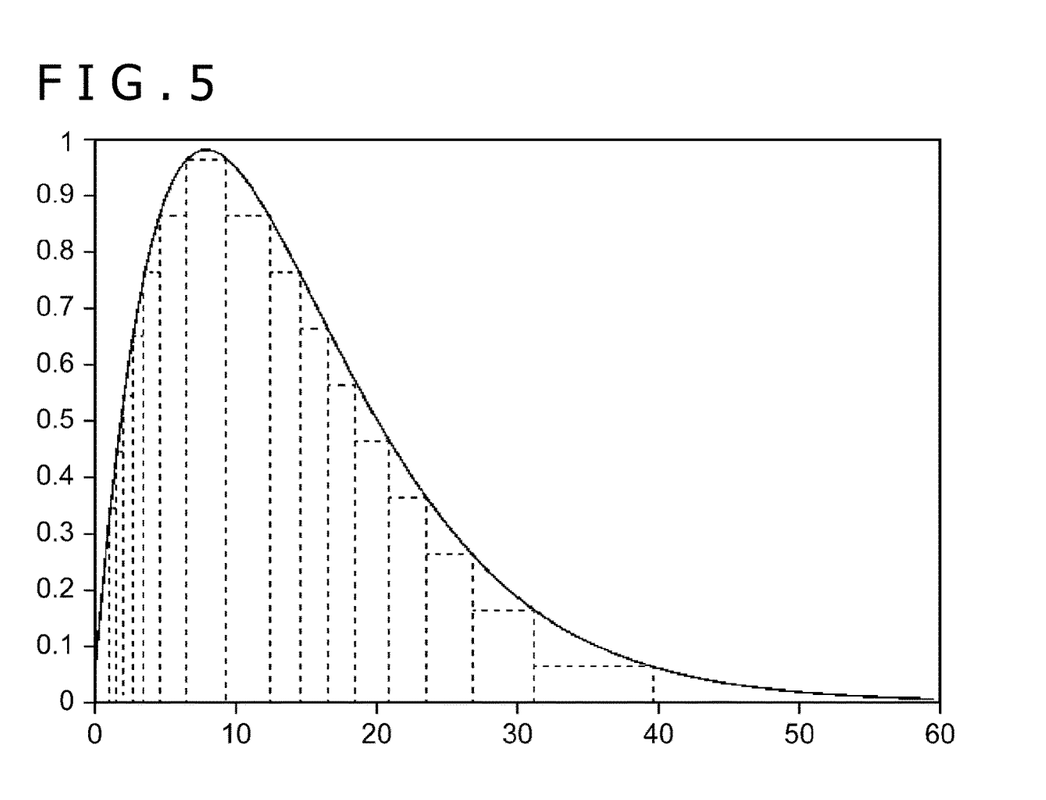
FIG. 5 is a diagram illustrating a graph of a contrast sensitivity characteristic.

FIG. 5 illustrates a graph of a contrast sensitivity level A calculated by the above-described characteristic function. Applying such a non-linear function every time calculating an acceptable value according to a space frequency f increases a processing load, and thus, discrete acceptable values may be prepared in advance as illustrated in dashed lines in FIG. 5. In this case, one acceptable value is determined for each of a plurality of space frequency bands. The width of a space frequency band corresponding to one threshold value may differ according to the frequency band, and is, in an example of FIG. 5, narrow in regions in which the value of the characteristic function changes rapidly, but wide in regions in which the value of the characteristic function changes gradually. Using such discrete acceptable values prepared in advance makes it possible to reduce an arithmetic operation load at the time of the determination of the sizes of the individual unit volume elements by the parameter determination section 53.

In the above description, the luminance value that does not depend on a particular color has been used as a color component value used for evaluating the contrast. Particularly in the case where the space frequency is high, it is known that the tendency of the visual characteristic does not largely change according to color. Thus, using the luminance value reduces a calculation load and makes it possible to estimate whether or not differences in color among adjacent unit volume elements are identifiable by persons. In this regard, however, the parameter determination section 53 may be configured to, for each of a plurality of color component values represented in the CIE LAB color space, the CIE LUV color space, or any other similar color space, determine whether or not the differences in color are identifiable in view of the human visual characteristic. Further, instead of the luminance value, a different index value such as a lightness value may be used in the determination.

The parameter determination section 53 performs, in accordance with such a criterion as described above, parameter adjustment processing that, for each of unit volume elements included in the appearance information acquired by the appearance information acquisition section 51, determines the size thereof or otherwise deletes a unit volume element that has become unnecessary. This processing results in making the sizes of the individual unit volume element mutually different but makes it possible to draw an appearance of the target object T with a suitable resolution according to a surrounding color distribution. Note that an example of a flow of processes performed by the parameter determination section 53 will be described in detail later.

The virtual space information output section 54 transmits, to the image output device 20, space information needed to draw a condition inside the virtual space. The space information transmitted by the virtual space information output section 54 includes information associated with the unit volume elements constituting the target object T and arranged in the virtual space. The sizes of these unit volume elements have already been changed by the parameter determination section 53. Thus, the number of the unit volume elements included in the space information is small, as compared with the number of the unit volume elements included in the appearance information transmitted from the information acquisition device 10 to the server device 30, thus enabling the reduction of a communication load.

The image output device 20 draws a space image representing a condition inside the virtual space in which the unit volume elements representing the target object T has been arranged, with use of the space information received from the server device 30. At this time, the image output device 20 draws the space image on the basis of the viewpoint position VP having been transmitted to the server device 30. The drawn space image is displayed on a screen of the display device 21 and is presented to a viewer. In this way, the space image including the appearance of the target object T is presented to the viewer. In this case, a resolution of the target object T in the space image has been adjusted according to a color distribution on the surface of the target object T and a distance d from the viewpoint position VP to the target object T in the virtual space.

Figure 6:
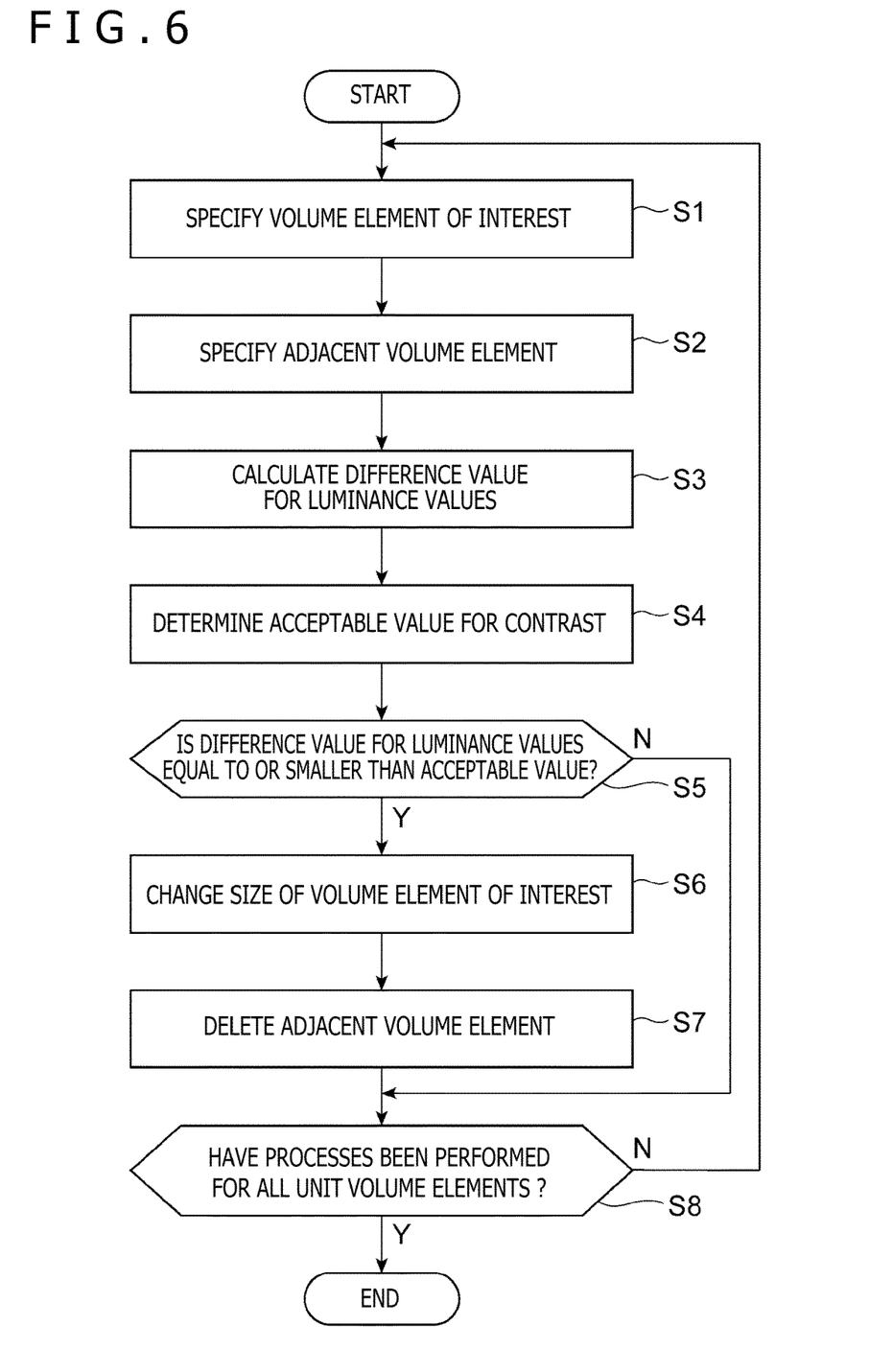
FIG. 6 is a diagram illustrating an example of a flow of processes performed by an information processing device according to an embodiment of the present invention.

Here, an example of a flow of specific processes by which the parameter determination section 53 determines the sizes of the individual unit volume elements will be described using a flow diagram of FIG. 6.

First, the parameter determination section 53 specifies a unit volume element located closest to the viewpoint position VP as a volume element of interest, by using appearance information having been acquired by the appearance information acquisition section 51 and position coordinates representing the viewpoint position VP and having been acquired by the viewpoint information acquisition section 52 (S1).

Next, the parameter determination section 53 specifies a unit volume element adjacent to the unit volume element of interest (namely, an adjacent volume element) (S2). Here, the adjacent volume element may be a plurality of unit volume elements that are located adjacent to the volume element of interest at individual positions in six directions/ i.e., upper, lower, front, back, left, and right directions, from the volume element of interest.

Subsequently, the parameter determination section 53 calculates the value of a difference between a luminance value of the adjacent volume element specified in S2 and a luminance value of the volume element of interest (S3). Here, in the case where the plurality of the adjacent volume elements have been specified, the values of differences between luminance values of the specified volume elements and the luminance value of the volume element of interest are calculated, and then, a minimum value among the calculated values of the differences is specified.

Moreover, on the basis of the position of the viewpoint position VP and the position of the volume element of interest, the parameter determination section 53 calculates a distance d between both the viewpoint position VP and the volume element of interest, and determines an acceptable value corresponding to the distance d and used in an evaluation of contrast (S4). This acceptable value may be a value calculated according to the above-described characteristic function, or may be a value that is stored in a table in advance on the basis of the characteristic function.

Further, the parameter determination section 53 determines whether or not the difference value for the luminance value calculated in S3 is equal to or smaller than the acceptable value determined in S4 (S5). In the case where the difference value is equal to or smaller than the acceptable value, the parameter determination section 53 makes a parameter change to enlarge the size of the volume element of interest (S6). In addition, the adjacent volume element that is now to be included in the volume element of interest is deleted (S7). In contrast, in the case where the difference value exceeds the acceptable value, the processes in S6 and S7 are skipped, and the size of the volume element of interest is kept as it is.

Upon completion of the above processes or, the volume element of interest, the parameter determination section 53 determines whether or not the processes have been performed on all of the unit volume elements (S8). In the case where any unprocessed unit volume element remains, the parameter determination section 53 returns to S1 to specify a new unit volume element as the next volume element of interest, and repeats the subsequent processes. In this case, the parameter determination section 53 specifies a unit volume element located closest to the viewpoint position VP among the unprocessed unit volume elements. That is, the parameter determination section 53 is configured in such a way as to perform the processes on each of the unit volume element in order from a unit volume element located closest to the viewpoint position VP. With this configuration, the processes on a unit volume element likely to be deleted as a result of enlarging the size of a different unit volume element are postponed, and as a result, the number of processes to be performed is highly likely to be decreased.

Note that, in the above example, for each of the unit volume elements, the value of a difference between a luminance value of the each unit volume element and a luminance value of an adjacent volume element is individually evaluated, but unit volume elements which fall within a wider range and for which mutual luminance value differences are equal to or smaller than an acceptable value may be specified and grouped into one large unit volume element.

As described above, according to the server device 30 according to the present embodiment, a resolution of the target object T in a space image to be presented to a viewer can be adjusted appropriately according to a surrounding color distribution and a distance d from the viewpoint position VP to the target object T, and a processing load at the time of drawing the space image and an amount of data communication between the information processing devices can be reduced without causing the viewer to feel a sense of strangeness.

Note that embodiments of the present invention are not limited to the above-described embodiment. For example, the method of determining the acceptable value in the above description is just an example. Human visual characteristics entail personal differences; particularly, differences are supposed to arise in color distributions identifiable by visual acuity. Thus, the server device 30 may be configured to acquire information associated with the visual acuity, the visual characteristic, and the like of a viewer in advance, and change an acceptable value for use in the parameter adjustment processing according to the details of the acquired information.

Further, in the above description, the target object T is assumed to be a real person, and processing has been described for a case in which an image reflecting the appearance of the real person on a real time basis is drawn. However, the target object T is not limited to a person and may be a different kind of object. Further, the target, object T is not limited to an object existing in the real space and may be any virtual object arranged in the virtual space. Particularly, in the case where an object prepared in advance and having a shape and any other attribute that do not largely change is treated as the target object T, for each of unit volume elements constituting the target object T, difference values indicating differences in color between the unit volume element and adjacent volume elements can be calculated in advance. Thus, the server device 30 may be configured to, for each of the unit volume elements, record in advance the values of differences in color between the unit volume element and surrounding unit volume elements. The parameter determination section 53 determines, in response to a request from the image output device 20, whether or not the recorded values of differences are equal to or smaller than an acceptable value corresponding to the distance d, and then changes the size of each of the unit volume elements. In this way, the amount of calculations to be performed on a real time basis can be reduced.

Further, at least a portion of the processes assumed to be performed by the server device 30 in the above description may be performed by a different device. Specifically, the parameter adjustment processing in which the parameter determination section 53 changes the sizes of the unit volume elements may be implemented by the image output device 20. In this case, the image output device 20 functions as the information processing device according to an embodiment of the present invention. In this way, the image output device 20 does not need to inform the server device 30 of the viewpoint information. Even allowing the image output device 20 to perform the parameter adjustment processing makes it possible to reduce the processing load at the time of drawing the space image by means of appropriately adjusting the size of each of the unit volume elements.

Further, the parameter adjustment processing may be implemented by the information acquisition device 10. In this case, the information acquisition device 10 functions as the information processing device according to an embodiment of the present invention. With this configuration, the size of each of the unit volume elements can be adjusted appropriately while the number of the unit volume elements can be reduced before the transmission thereof to the server device 30. Thus, the amount of data associated with the unit volume elements transmitted to the server device 30 can be reduced.

Further, in the above description, the target object T in the virtual space has been assumed to be constituted by the unit volume elements, but, without being limited to this configuration, even in the case where the target object T is constituted by polygons or the like, the configuration in which the resolution at the time of drawing of the space image is changed according to a color distribution on the surface of the target object T and a distance d may be employed. In this case, for example, when a condition of the virtual space as viewed from the viewpoint position VP is projected on a projection face, the configuration is made in such a way as to lower a resolution of a projected object according to a distance d and a color distribution on the surface of the target object T. With this configuration, the resolution can be lowered in a way that is difficult for a viewer to notice.

REFERENCE SIGNS LIST

1 Information processing system, 10 Information acquisition device, 11 Distance image sensor, 20 Image output device, 21 Display device, 30 Server device, 31 Control unit, 32 Storage unit, 33 Communication unit, 51 Appearance information acquisition section, 52 Viewpoint information acquisition section, 53 Parameter determination section, 54 Virtual space information output section

The invention claimed is:

1. An information processing device comprising:
an appearance information acquisition section that acquires appearance information associated with an appearance of a target object to be a target of drawing, wherein the appearance information includes information associated with a plurality of unit volume elements being arranged in a virtual space and constituting the target object; and
a parameter determination section that determines a parameter associated with a resolution of the target object and used in the drawing of a condition of the target object as viewed from a given view point, on a basis of a color distribution on a surface of the target object and information associated with a distance from the view point to the target object, the color distribution being specified by the acquired appearance information,
wherein the parameter determination section determines a size of each of the plurality of unit volume elements based on a difference between a color component value of the unit volume element and a color component value of a unit volume element adjacent to the unit volume element
wherein the parameter determination section compares the difference with a threshold that changes nonlinearly relative to the distance according to a visual characteristic of a viewer, to determine whether or not the size of the unit volume element is to be changed.

2. The information processing device according to claim 1, wherein
the parameter determination section determines a size of each of the plurality of unit volume elements, as the parameter associated with the resolution.

3. The information processing device according to claim 2, wherein the appearance information is information generated on a basis of a distance image obtained by observation of the target object existing in a real space, and each of the plurality of unit volume elements is associated with a unit portion included in the distance image.

4. An information processing method comprising:
acquiring appearance information associated with an appearance of a target object to be a target of drawing, wherein the appearance information includes information associated with a plurality of unit volume elements being arranged in a virtual space and constituting the target object;
determining a parameter associated with a resolution of the target object and used in the drawing of a condition of the target object as viewed from a given viewpoint view point, on a basis of a color distribution on a surface of the target object and information associated with a distance from the viewpoint view point to the target object, the color distribution being specified by the acquired appearance information;
determining a size of each of the plurality of unit volume elements based on a difference between a color component value of the unit volume element and a color component value of a unit volume element adjacent to the unit volume element; and
determining whether or not the size of the unit volume element is to be changed based on the comparison of the difference with a threshold that changes nonlinearly relative to the distance according to a visual characteristic of a viewer, to determine whether or not the size of the unit volume element is to be changed.

5. A non-transitory computer readable medium having stored thereon a program for a computer, comprising:
by an appearance information acquisition section, acquiring appearance information associated with an appearance of a target object to be a target of drawing, wherein the appearance information includes information associated with a plurality of unit volume elements being arranged in a virtual space and constituting the target object; and
by a parameter determination section, determining a parameter associated with a resolution of the target object and used in the drawing of a condition of the target object as viewed from a given viewpoint view point, on a basis of a color distribution on a surface of the target object and information associated with a distance from the view point to the target object, the color distribution being specified by the acquired appearance information,
wherein the parameter determination section determines a size of each of the plurality of unit volume elements based on a difference between a color component value of the unit volume element and a color component value of a unit volume element adjacent to the unit volume element
wherein the parameter determination section compares the difference with a threshold that changes nonlinearly relative to the distance according to a visual characteristic of a viewer, to determine whether or not the size of the unit volume element is to be changed.

* * * * *